United States Patent Office 2,825,363
Patented Mar. 4, 1958

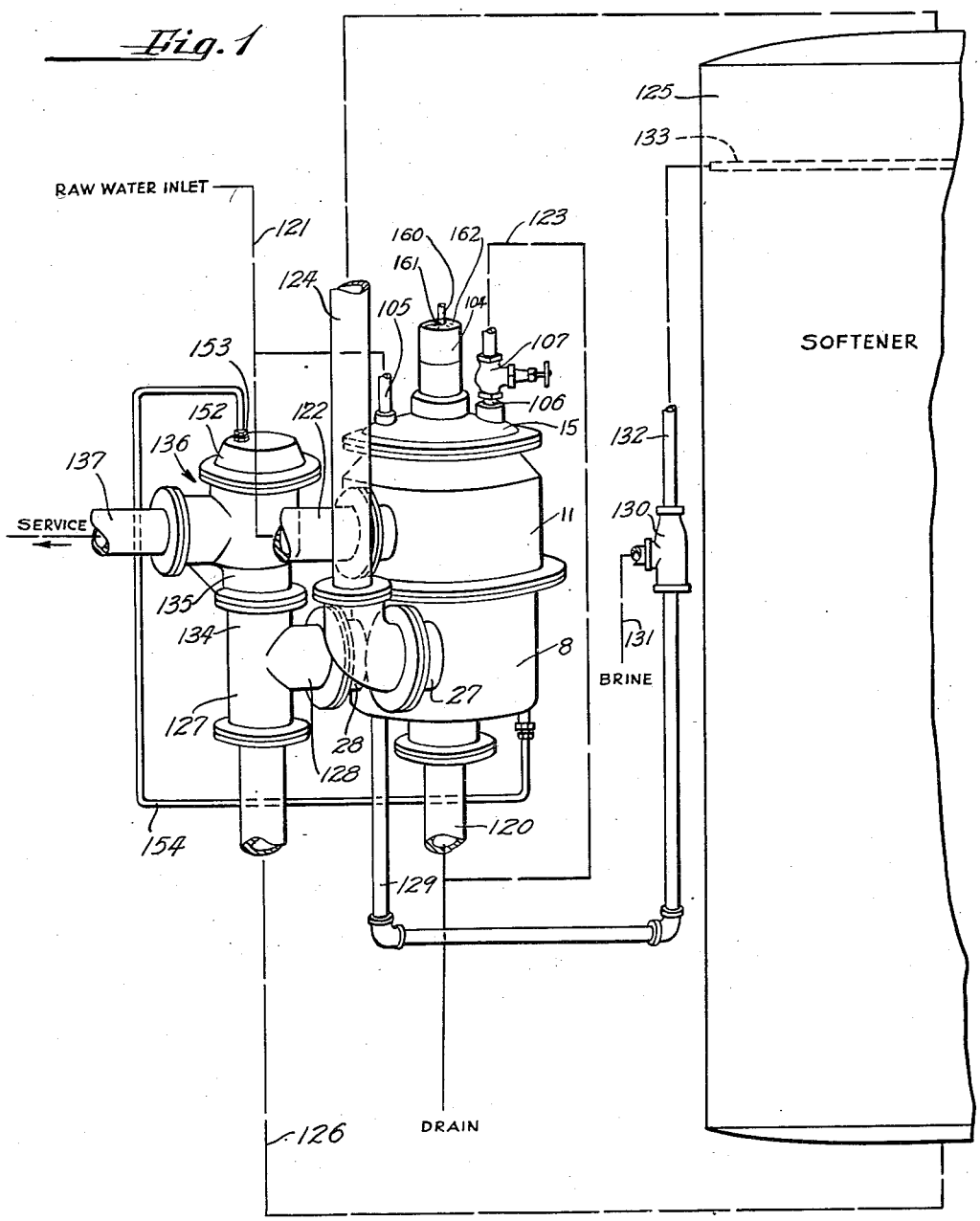

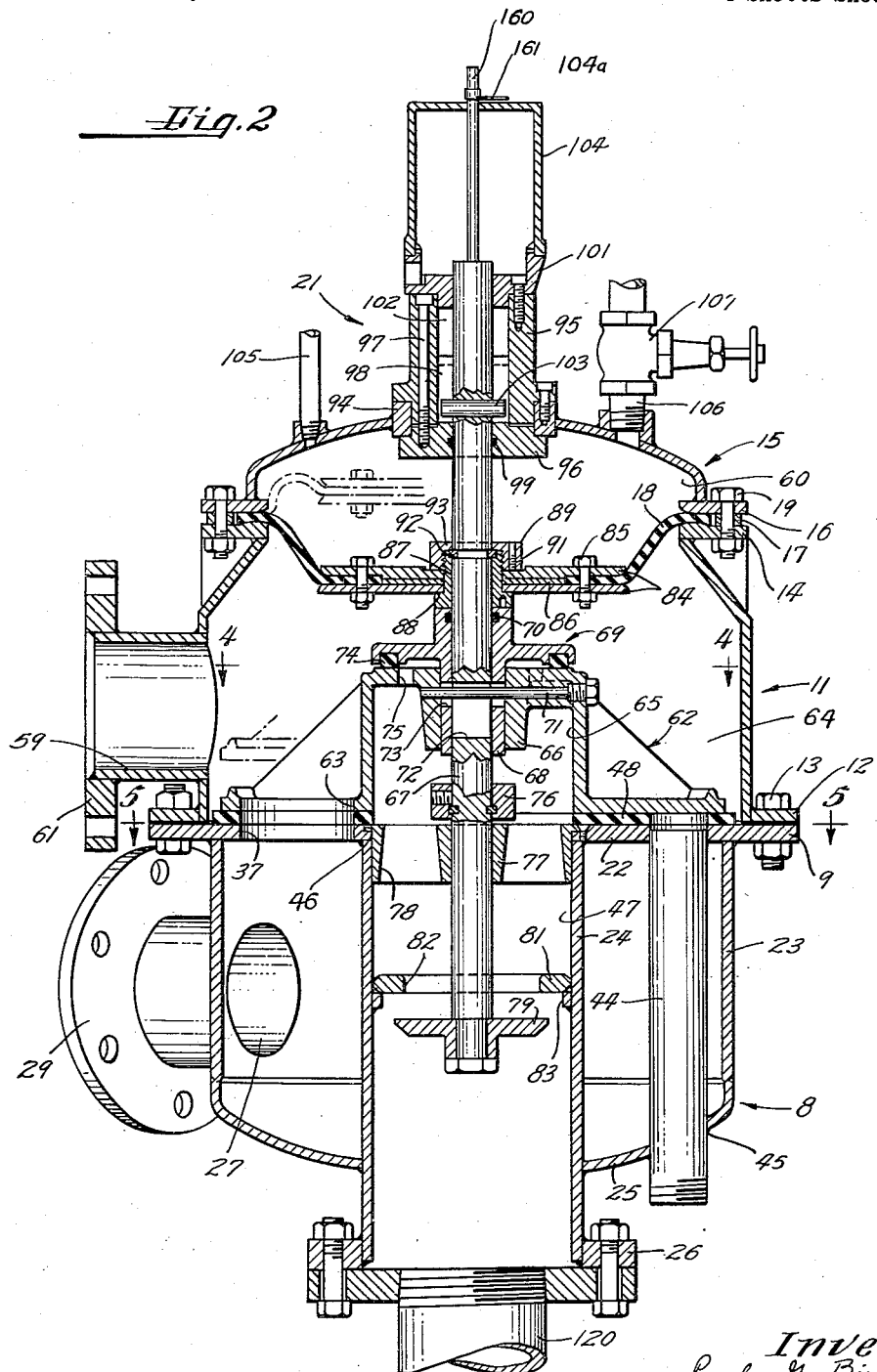

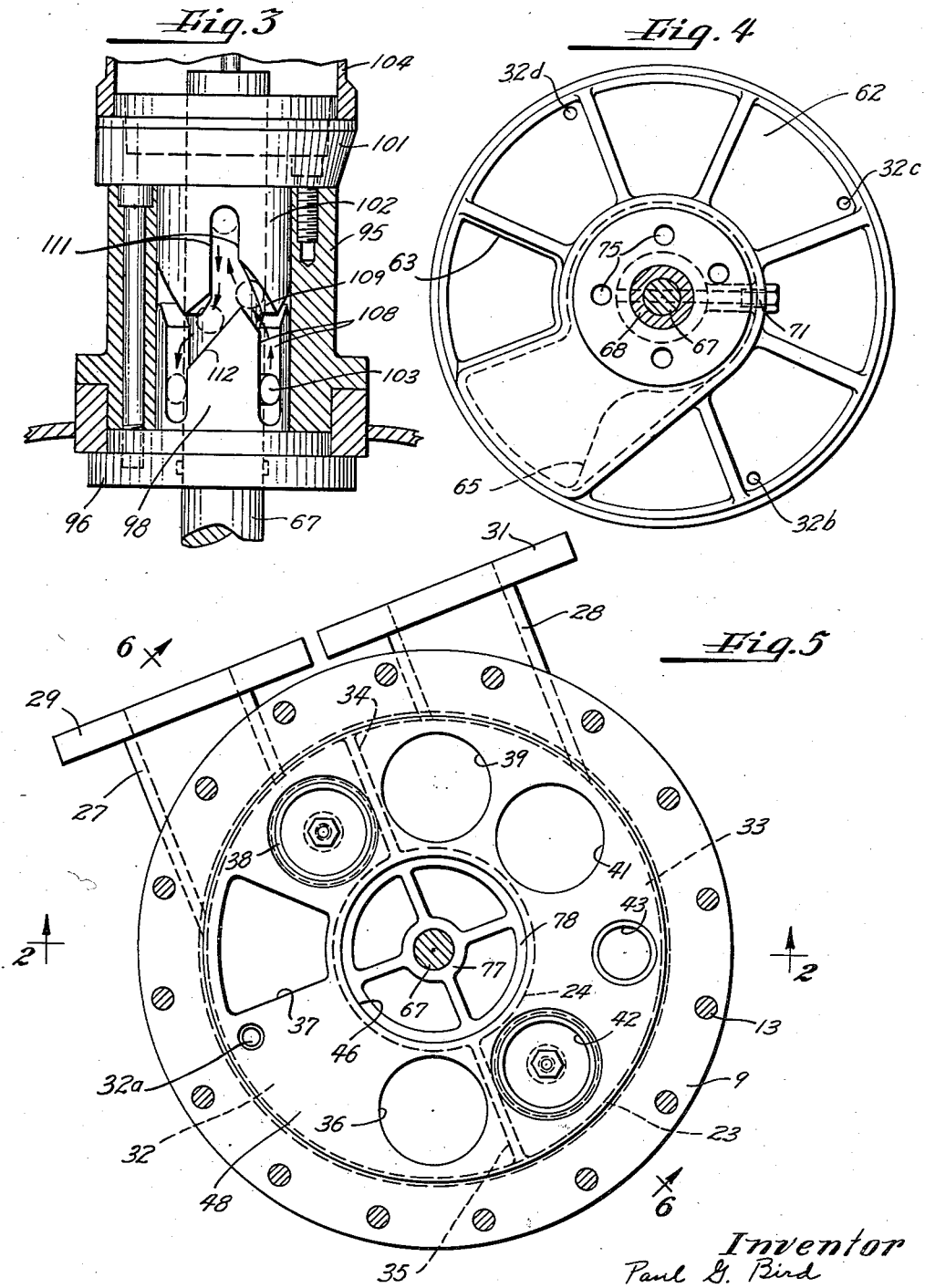

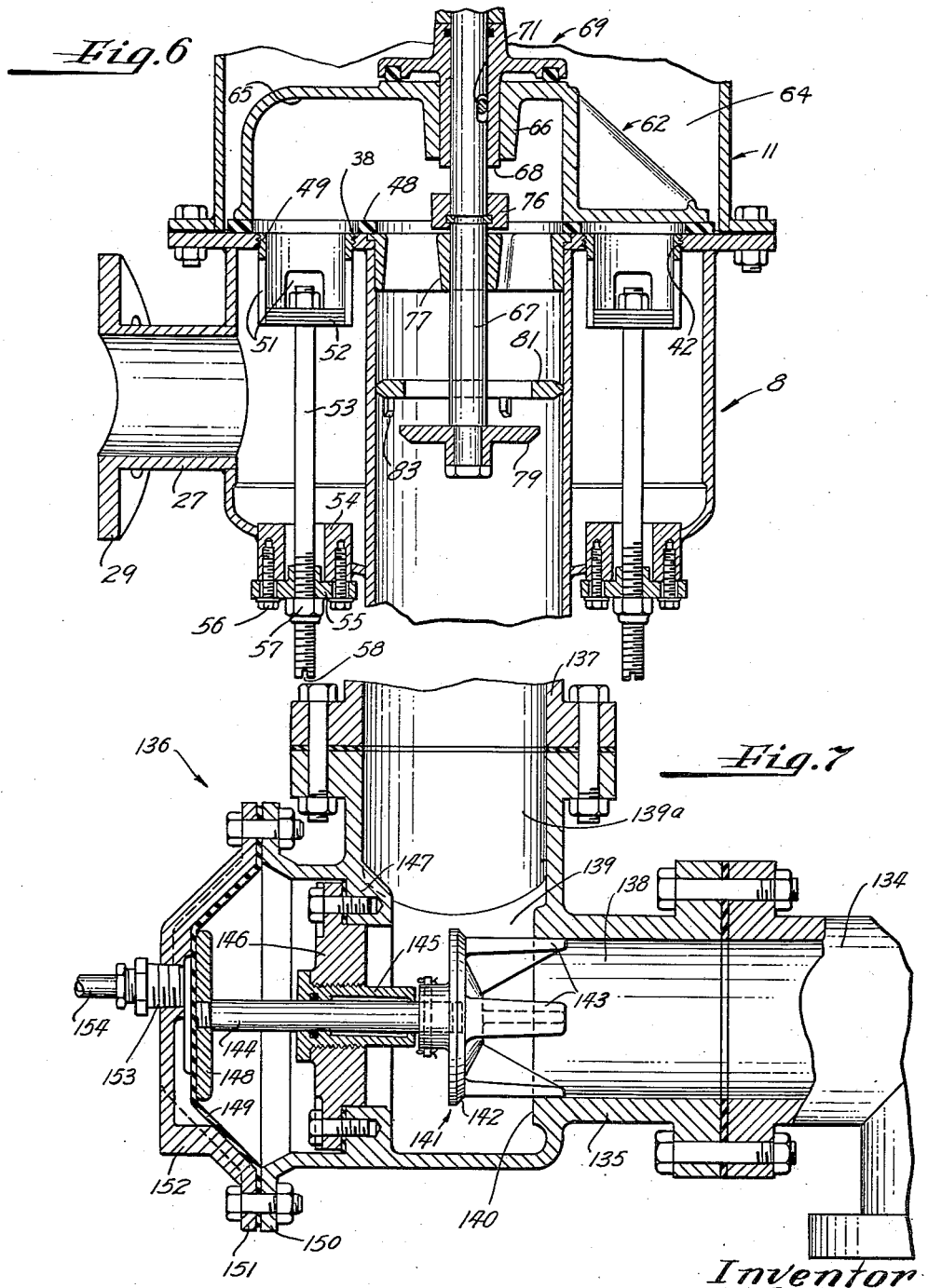

2,825,363

CONTROL SYSTEM FOR WATER TREATMENT APPARATUS

Paul G. Bird, Rockford, Ill., assignor to Aquamatic Inc., a corporation of Illinois Application December 26, 1952, Serial No. 328,108

15 Claims. (Cl. 137—627.5)

This invention relates to control apparatus for fluid treatment systems, and in particular to control apparatus for water softeners, deionizers, filters and the like.

It is an object of this invention to provide novel and improved control apparatus for fluid treatment systems.

Another object of this invention is to provide novel control apparatus for water treatment systems which is capable of handling greater flow rates and with a minimum of water pressure loss in the control apparatus for a given size of the control apparatus.

It is also an object of this invention to provide control apparatus for fluid treatment systems which includes a valve of novel construction in which the passages of the valve are required to pass only one flow each during a complete cycle of operation of the control apparatus, thereby enabling each of these ports to be designed for optimum flow characteristics for the particular flow which it is required to pass.

Also, an object of this invention is to provide control apparatus for a fluid treatment system which includes a control valve for controlling flow through the treatment system and a service line valve controlled by the control valve to prevent the flow of fluid from the treatment system to service while the treatment system is being regenerated.

Another object of this invention is to provide control apparatus for a fluid treatment system which includes a lift turn valve for controlling the various flows through the system in different settings of the distributor in the lift turn valve and a service valve for controlling the flow of fluid from the system to a service outlet and arranged to be closed responsive to the lift turn valve while the treatment system is being regenerated and while the distributor in the lift turn valve is unseated.

It is also an object of this invention to provide a valve of novel construction which enables optimum flow characteristics through the valve in all of its operative positions.

A further object of this invention is to provide a valve of the type having a face member provided with a plurality of passages and a distributor mounted to be positioned in confronting relation with the face and to be turned between preselected rotative settings for establishing different flows through the valve, wherein the valve is of novel construction such that each passage at the face member is required to pass only one flow for a complete cycle of angular settings of the distributor.

A still further object of this invention is to provide a lift turn valve provided with a novel drain valve of simplified and space saving construction.

Other and further objects and advantages of the present invention will be apparent from the following description of a preferred embodiment thereof, which is shown in the accompanying drawings to illustrate the construction and principles of operation of the invention.

In the drawings:

Figure 1 discloses the control apparatus of the present invention embodied in a water softening or deionizing system;

Figure 2 is a longitudinal section through the lift turn valve forming part of the Fig. 1 control apparatus, the section being taken along the line 2—2 in Fig. 5 and showing the valve in the normal service position;

Figure 3 is a fragmentary sectional view of the Fig. 2 valve, showing the cam arrangement for turning the distributor of the valve;

Figure 4 is a section along the line 4—4 in Fig. 2, showing the top of the distributor of the valve;

Figure 5 is a section along the line 5—5 in Fig. 2, showing the body face;

Figure 6 is a fragmentary section through the control valve, taken along the line 6—6 in Fig. 5; and Figure 7 is a longitudinal section through the service valve of the Fig. 1 apparatus.

The control apparatus of the present invention includes a control valve of the lift turn type which have in the past largely been used to control the liquid flows in base exchange water treatment apparatus, such as softeners and filters. This valve includes a body indicated generally by the numeral 8 having an annular top flange 9, it being understood that terms such as "top" and "bottom" as used herein are intended to be relative and refer only to the positions as shown in the drawings. A distributor housing 11, likewise having an annular bottom flange 12 is secured to the top of the body by means of spaced bolts 13 passing through the flanges and through a sealing gasket interposed between the flanges. The housing 11 also has a top flange 14 to which a cover 15 is attached by means of a cover flange 16, the annular outer edge 17 of a diaphragm 18 being interposed between the flanges 14 and 16 and secured in fluid tight relation thereto by annularly spaced bolts 19. The cover 15 carries a centrally disposed cam mechanism indicated generally by the numeral 21 which will presently be described in more detail.

Referring now to the structural details of the body 8 shown in Figure 2, the body has a flat plate-like member 22, in this instance of circular configuration inasmuch as the illustrated embodiment of the valve is of generally circular cross-sectional shape. As will be seen from Figure 2, the flange 9 is a continuation of the plate member 22. The body also includes concentric tubular body walls 23 and 24 extending downwardly from the plate member 22, the outer walls 23 converging inwardly in spaced relation to the plate member 22, as shown at 25, and merging with the wall 24. The lower end of the tubular wall 24 carries a conventional pipe flange 26 for connection to a drain pipe 120. Pipe connections 27 and 28 are provided through the wall 23 in the form of nipples, integral with the wall 23, carrying conventional pipe flanges 29 and 31 for connection respectively to conduits leading to the top and bottom of a conventional base exchange softener tank, as dscribed in greater detail hereinafter. The space between the walls 23 and 24 is divided into two separate chambers 32 and 33 by longitudinally disposed inmperforate walls 34 and 35, the pipe connections 27 and 28 each communicating with one of the chambers.

The inner plate member 22 is provided, in this embodiment, with four annularly spaced pairs of passages, with each passage of each pair being blocked from communication in the body with the other passage of the same pair. As best seen in Fig. 5, the first pair of passages consists of the passage 37 leading down into the chamber 32 in the body and the passage formed by the open upper end of a pipe 32a extending through the chamber 32 in the body. Obviously, the pipe 32a separates the passages of this first pair from fluid communication in the body with one another. The second pair of passages at the ported plate member 22 consists of the passages 38 and 39, which communicate respectively with the separate chambers 32 and 33 in the body and which are separated from fluid communication in the body with one another by the chamber walls 34 and 35. The third pair of passages at the plate member 22 consists of the passage 41 leading into the body chamber 33 and the passage 43 formed by the open upper end of the pipe 44 which extends down through the body chamber 33 and is sealed to the bottom of the body as shown at 45 in Fig. 2. The pipe 44 separates the passages of this third pair from fluid communication in the body with one another. The fourth pair of passages at the plate member 22 consists of the passages 42 and 36, which communicate respectively with the body chambers 33 and 32 and which are separated from fluid communication in the body with one another by the chamber walls 34 and 35.

A central passage 46 in the plate member 22 communicates with a chamber 47 defined by the walls 24 of the body. Disposed above the upper side of the plate member 22 is a gasket 48 of rubber or other suitable resilient gasket material connected to the plate member 22 and provided with openings therethrough corresponding in shape and size with the above-described passages in the plate member 22.

Each of the passages 38 and 42 is provided with a flow restricting or throttling valve of identical construction, each comprising a thimble 49 threaded into the passage in the plate member 22 and depending into the chamber beneath. The thimble is open at its lower end and in the embodiment shown has four slots as indicated at 51 extending upwardly from its bottom edge. A plunger 52 fits within the thimble and is mounted on a stem 53 projecting downwardly through the chamber and through a boss 54. The lower end of the stem is threaded and passes through the threaded bore of a cap 55 secured against the boss 54 by screws 56, the stem carrying a jam nut 57 for locking the stem in adjusted position. A slot 58 at the end of the stem is adapted to receive a tool for rotating the stem to adjust the position of the plunger 52 in the thimble and thereby determine the area of slots 51 through which flow may occur between the bottom chamber and the passages 38 or 42.

The distributor housing 11 has an inlet pipe connection 59 provided with the usual pipe flange 61 for connection into a supply line of a system of piping in the usual manner. Disposed within the housing is a distributor plate 62 having a substantially flat lower face adapted to seat on the gasket 48 and to control the fluid flow through the passages in the plate member 22. As best shown in Fig. 4, the distributor has an open passage 63 extending therethrough on substantially the same radius as the passages in the plate member to permit communication between the chamber 64 within the housing 11 and certain of the passages in the plate member in the various rotative positions of the distributor and has a transfer passage 65 registering at one end at all times with the central passage 46 and selectively registrable at its other end with certain passages of the plate member to establish communication therebetween in the various positions of the distributor. Auxiliary passages 32b, 32c and 32d extend through the distributor and are positioned to register successively with the passage formed by the upper end of the pipe 32a extending through the body chamber 32 in successive rotative positions of the distributor. The bottom surface of the distributor is otherwise imperforate. According to the present invention there is centrally disposed on the distributor a supporting flange 66 for connecting the distributor to a centrally disposed stem 67, a sleeve 68 of an auxiliary valve disk 69 being interposed between the flange and the stem. The distributor is attached to the stem by a pin 71 threaded into the distributor and passing through a slot 72 in the stem to provide lost motion therebetween, the pin also passing through slots 73 in the sleeve 68 to provide lost motion between these parts. The valve disk 69 overlies a portion of the upper side of the distributor and has a gasket 74 cooperating therewith to control flow between the chamber 64 and the transfer passage 65 through a plurality of passages 75. An O-ring seal 70 is disposed between the stem 67 and sleeve 68 of auxiliary valve 69 adjacent the upper end of the sleeve to prevent leakage along the interface.

The stem carries a collar 76 attached thereto below the supporting flange 66 and passes through a guide 77 disposed in the port 46. The stem extends into the chamber 47 and carries an auxiliary valve disk 79 of substantially smaller dimensions than the chamber adapted in the upward movement of the stem to engage against the bottom of a valve ring 81, snugly received in chamber 47 to close the central opening 82 in the ring and to raise the ring free of supporting lugs 83 attached to side walls 24 and projecting into the chamber 47, to support the ring in the lower position of the stem.

The diaphragm 18, which has its perimeter clamped in a fluid tight manner between flanges 14 and 16 forms with associated parts the upper wall of chamber 64 and the lower wall of a pressure chamber 60, and has a central opening for the passage of stem 67. The stem is attached to the diaphragm by means of a pair of clamping plates 84, the inner edge of the diaphragm being clamped between the plates by action of bolts 85 which draw the outer edges of the plates together to compress the diaphragm therebetween in fluid tight fashion. A spacer plate 86 is disposed between the clamping plates for obvious reasons. The stem carries an externally threaded sleeve 87 within which the stem is capable of rotation, the clamping plates and spacer having a central opening for the reception of the sleeve so that the clamping assembly seats against a shoulder 88 on the sleeve and is held thereagainst by a nut 89 threaded onto the sleeve and bearing against the upper side of the clamping assembly. The nut is held against rotation by a lock screw 91 engaging the clamping assembly. A split ring 92 is disposed in adjoining recesses in the stem and sleeve and bears the end thrust occasioned by lifting of the stem and distributor by action of the diaphragm, and a lip 93 on the nut serves to prevent more than very limited movement of the sleeve axially downward with respect to the stem.

The cam mechanism 21 is centrally mounted on the cover 15 which has an integral mounting flange 94 to which a cam housing 95 is bolted, a gasket being interposed therebetween. Surrounding the stem is a lower cam member (best shown in Fig. 2) having an annular flange portion 96 secured against the mounting flange 94 by cap screws 97 with a gasket interposed therebetween for sealing purposes and a cam portion 98 disposed within the cam housing 95. The cam member carries an O-ring seal 99 to seal the interface along the shaft. An upper cam member has a flange portion 101 secured across the upper end of the cam housing and a depending cam portion 102 disposed in spaced relation to the lower cam portion 98 for the reception therebetween of followers in the form of projecting ends of a pin 103 secured in the stem. The stem projects above the flange portion 101 in the seated position of the valve and the projecting end is enclosed by a cap 104 secured to the flange portion and extending upwardly a distance sufficient to permit rising of the stem. Communicating with the chamber 60 defined by the diaphragm and the cover 15 is an inlet connection 105 of relatively small size and an outlet connection 106 of substantially larger size than the inlet connection having a pilot valve 107 for controlling the outlet flow from the chamber 60.

An extension rod 160 is connected to the upper end of valve stem 67 and projects up through the flat top wall 104a of the cap 104. As best seen in Figs. 1 and 2, this extension rod carries a pointer 161 which overlies indicia 162 carried on the upper face of the top wall 104a of cap 104. Thus, pointer 161 is arranged to move in unison with the valve stem 67 and to coact with the indicia on stationary cap 104 to indicate the rotative setting of the distributor 62 in the valve.

The above-described control valve is shown in Fig. 1, by way of illustrating one use thereof, as part of control apparatus for a conventional base exchange water treating tank. An untreated water inlet 121 has a branch conduit 122 connected to the inlet pipe 59 for passing raw water into the chamber 64 in the valve. The raw water inlet 121 is also connected to the pipe 105 for passing raw water continuously into the pressure chamber 60 in the valve above the diaphragm 18. The outlet conduit 106 from this pressure chamber is connected through valve 107 to a conduit 123 leading to drain.

The pipe 44 extending down through the chamber 33 in the control valve has its lower end connected to a conduit 129 leading to the inlet of an ejector 130. This ejector also is connected to a brine inlet pipe 131 in the conventional manner, such that the flow of water from pipe 129 through ejector 130 draws brine from pipe 131 up through the outlet pipe 132 from the ejector to a distributor pipe 133 located at the top of the treatment tank 125 above the bed of base exchange material therein.

The pipe connection 27 leading from the chamber 32 in the lift turn valve is connected to a conduit 124 leading to the top of the treatment tank 125. From the bottom of the treatment tank, below the bed of base exchange material therein, there is provided a conduit 126 leading to a T-coupling 127, one leg of which, 128, is connected to the pipe coupling 28 communicating with the other chamber 33 in the control valve.

The T-coupling 127 also has an outlet arm 134 connected to the inlet pipe connection 135 for a pressure responsive auxiliary service valve, indicated generally at 136, which controls the flow in the service line 137. As best seen in Fig. 7, the inlet pipe connection 135 defines an inlet passage 138 leading to a valve chamber 139 in the service valve which extends perpendicular to the inlet passage, an annular flat valve seat 140 being formed at the juncture between the inlet passage 138 and the valve chamber 139. An outlet passage 139a leads from the valve chamber 139 to the service pipe 137.

For controlling the flow of fluid from the inlet passage 138 into the valve chamber 139 there is provided the slidable valve 141 located in the valve chamber 139 and having a frusto-conical face 142 for engagement with the valve seat 140. The valve 141 carries a plurality of spaced forwardly protruding fingers 143 which are snugly, yet slidably, received in the inlet passage 138 for guiding the movement of valve 141 toward and away from the valve seat 140. The valve 141 is carried by a stem 144 extending slidably through a bushing 145 threadedly mounted in a closure plate 146 bolted to an internal annular shoulder 147 formed in the housing of valve 136 in spaced relation from the valve seat 140. At its outer end the stem 144 is threadedly connected to a diaphragm plate 148 attached to one face of a flexible, resilient diaphragm 149 of rubber or the like. The diaphragm 149 is clamped at its periphery between a flange 150 on the housing of valve 136 and a flange 151 of the generally cup-shaped cover cap 152. From Fig. 7 it will be apparent that the middle of the diaphragm is free to move back and forth between the cover cap 152 and the closure plate 146 for moving the valve 141 correspondingly. The cover cap 152 carries a nipple 153 to which is connected a pipe 154 leading to the above-described pipe 32a extending up through the body chamber 32 in the control valve. Thus, when fluid under pressure is supplied from the control valve through pipe 154 to the cover cap 152, it forces the diaphragm 149 to the right in Fig. 7 to close valve 141 and thereby block the flow of treated water from the bottom of softener tank 125 to the service line 137. When the fluid pressure at the cover cap 152 is relieved, the diaphragm 149 is permitted to return to its retracted position, shown in Fig. 7, under the force of the fluid pressure in the inlet passage 138 acting against valve 141 and tending to open this valve.

*Operation*

In the operation of the above-described control apparatus of the present invention, in the normal or service condition the distributor 62 of the control valve is positioned with its passage 63 registering with the passage 37 in the inner plate member 22 and with the transfer passage 65 registering with the open upper end of the pipe 32a communicating with the back side of the diaphragm 149 of the auxiliary service valve 136. With the distributor seated in confronting relation with this inner plate member, raw water from conduit 122 passes into the distributor chamber 64 in the valve and thence down through distributor passage 63 and the registering passage 37 at the plate member 22 into the chamber 32 in the body, from which it passes through conduit 124 to the top of the treatment tank 125. After passing down through the base exchange material in the treatment tank, the water passes from the bottom of the tank through pipe 126 and thence through T-coupling 127 and service valve 136 to the service line 137. At this time the fluid pressure at the back side of the diaphragm 149, which controls the valve element 141 in service valve 136, is relieved to drain through pipes 154 and 32a and the transfer passage 65 in the distributor of the control valve. This pressure relief at the back side of the diaphragm permits the fluid pressure in the inlet passage 138 of the auxiliary service valve to move the valve element 141 away from its seat 140, to permit the flow of effluent to the service line 137.

To shift the distributor of the valve to its next position the pilot valve 107 is opened to establish communication between the pressure chamber 60 and drain to allow the fluid to drain from this chamber and the pressure therein to fall to a point substantially below that in chamber 64. The difference in pressure between the two chambers causes the diaphragm 18 to move upward until the nut 89 engages the flange portion 96, bringing the stem 67 upwardly to the same extent by action of sleeve 87 on ring 92.

During the initial part of the upward movement of the stem the slot 72 permits the stem to move with respect to the pin 71 so that the valve plate 79 engages the valve ring 81, closing the central opening 82 and terminating communication between drain passage 46 and the drain connection. Upon further upward movement of the stem, the plate 79 raises the ring 81 from lugs 83 as shown in Figs. 2 and 6 to maintain the drain line 47 closed. With continued upward movement of the stem the collar 76 engages the lower end of the sleeve 68 causing the sleeve and valve disk 69 to move upwardly in the supporting flange 66, the slots 73 permitting such relative movement. This moves the disk upwardly away from the distributor and opens communication between the passage 65 and the chamber 64 through openings 75 as shown in Fig. 6, allowing the hydraulic pressure within the drain passage to become substantially equal to that in the chamber 64. When the stem brings the collar 76 against the lower end of supporting flange 66, continued upward movement of the stem raises the lower face of the distributor free or substantially free of the gasket 48.

Referring now to Fig. 3, during the upward movement of the stem just described the ends of the cam follower pin 103 move vertically upward between parallel faces 108 at diametrically opposite sides of the lower cam 98. At the point in the upward movement of the stem at which the distributor is substantially free of the gasket the ends of the cam follower pin come into engagement with helically disposed faces 109 of the upper cam 102 and, with continued upward movement of the stem, slide along these faces to rotate the stem and, through the pin 71, rotate the distributor through 45 degrees, after which the cam pin enters between parallel faces 111 of the upper cam.

When the control valve 107 is closed, fluid entering pressure chamber 60 through connection 105 causes the pressure to build up to a point equal or exceeding that in chamber 64, whereupon the diaphragm and stem move down. During downward movement the ends of the cam follower pin 103 first move down between the parallel faces 111 of the upper cam until they contact helical faces 112 of the lower cam and they then slide along these faces, rotating 45 degrees, until they reach the succeeding pairs of parallel faces 108 of the lower cam. At this point in the downward or reseating movement of the stem, the distributor has been turned through 90 degrees. As the stem continues its downward movement the distributor contacts the gasket 48 overlying the plate member 22 and the collar 76 moves away from the end of support flange 66, allowing valve disk 69 to reseat on the top of the distributor. Subsequently, the valve ring 81 engages the lugs 83 and the valve plate 79 moves away from the ring to reopen the drain and bring the distributor to the next seated position, with the open distributor passage 63 in registration with passage 39 in the plate member 22, the distributor transfer passage 65 in registration with passage 38, and the distributor passage 32b registering with the open upper end of pipe 32a, bringing the parts to the position shown in Fig. 6.

In this position of the distributor, raw water at the distributor chamber 64 flows down through distributor passage 32b into pipe 32a and thence through conduit 154 to the back side of the diaphragm 149 at the service valve 136. The fluid pressure against this diaphragm causes it to move the valve element 141 closed. Also, water from chamber 64 flows down through distributor passage 63 and passage 39 in the plate member 22 into the body chamber 33 and from here through pipe connection 28, coupling 127 and conduit 126 to the bottom of the treatment tank 125. After backwashing upward through the tank, the effluent passes from the top of the treatment tank through conduit 124 and pipe connection 27 into the chamber 32 in the valve. From here the backwash effluent passes up through the passage 38 in the plate member 22 to the transfer passage 65 in the distributor leading to drain. The adjustment of the throttling valve 52 at passage 38 determines the flow rate through the treatment tank during backwash.

By successively opening and re-closing valve 107 the distributor of the valve is moved by 90 degree steps to successively establish the reagent injection and rinse steps of the regeneration cycle.

Thus, in the third, or reagent injection position of the distributor of the valve, the distributor passage 63 registers with the open upper end 43 of the pipe 44 in the body, the distributor passage 32c registers with the open upper end of the pipe 32a in the body, and the distributor transfer passage 65 registers with the passage 41 in the plate member 22. At this position of the distributor, raw water from the chamber 64 flows down through distributor passage 32c into pipe 32a and thence through conduit 154 to the back side of the diaphragm 149 at the service line valve 136 to maintain this valve closed. Also, water from the chamber 64 passes down through distributor passage 63 into pipe 44 and thence through conduit 129 to the ejector 130, where it draws reagent through the line 131 up through conduit 132 to the perforated distributor pipe 133 at the top of the treatment tank. After flowing down through the base exchange material in the tank to regenerate the same, the effluent is passed from the bottom of the tank through conduit 126, T-coupling 127 and pipe fitting 28 into the chamber 33 in the valve. From here the effluent passes up through the passage 41 at the plate member 22 into the distributor transfer passage 65 and thence to drain. Obviously, the nozzle in the ejector 130 determines the flow rate through the tank in the injection step.

In the final, or rinse, position of the distributor, the distributor passage 63 registers with the passage 36 in the plate member 22, the distributor passage 32d registers with the open upper end of pipe 32a, and the distributor transfer passage 65 registers with the passage 42. At this distributor position, raw water passes down through distributor passage 32d into pipe 32a and thence through conduit 154 to the back side of the diaphragm at the service valve 136 to maintain this valve closed. Also, water passes down through distributor passage 63 and the registering passage 36 at the plate member 22 into the body chamber 32, from which it passes through pipe connection 27 and conduit 124 to the top of the treatment tank. The rinse water passes down through the bed of exchange material in the treatment tank and from the bottom of the tank passes through conduit 126, T-coupling 127 and pipe connection 28 into the chamber 33 in the valve. From here the rinse effluent passes up through passage 42 at the plate member 22 into the distributor transfer passage 65 and thence to drain. The adjustment of the throttling valve at the passage 42 in the valve determines the flow rate through the treatment tank in the rinse step.

Obviously, each time the distributor 62 is unseated water is free to flow from the chamber 64 into the open upper end of pipe 32a at the plate member 22 to apply pressure against the back side of diaphragm 149 for moving the valve element 141 of the service valve 136 to closed position or maintaining this valve closed, as the case may be.

From the foregoing it will be seen that each of the passages at the plate member 22 passes only one flow during the complete cycle of rotative settings of the distributor. This is of particular advantage because these passages may be constructed for optimum flow characteristics for the particular flow which each is required to pass, without the necessity of compromising the construction of any of these ports for accommodating several different flows therethrough. It has been found that this novel construction enables the control apparatus of the present invention to handle substantially greater flow rates with a much lower pressure loss in the valve than heretofore possible for a given size of the valve.

While in the foregoing description and in the accompanying drawings there is disclosed a specific preferred embodiment of the present invention, it is to be understood that various modifications, omissions and refinements departing from the disclosed form of the invention may be resorted to without departing from the spirit and scope of this invention.

I claim:

1. A valve comprising, in combination, a plate member provided with a plurality of passages therethrough, one of said passages being a drain passage located centrally at said plate member, said passages at the plate member including a plurality of spaced pairs of passages, the passages of each pair being positioned next to one another, partition means separating each passage of each pair from fluid communication at said plate member with the other passage of the same pair and from fluid communication at said plate member with said drain passage, a distributor member mounted in confronting relation with the plate member and mounted to be turned with respect to said plate member for establishing different flows through the valve in different rotative positions of the distributor member, said distributor member including a first passage extending through the distributor member and positioned to register with a preselected passage of each pair of passages at the plate member in each of a plurality of rotative positions of the distributor member, said distributor member having an opening disposed next to said first distributor member passage to register with the other passage of each pair of passages at the plate member in the respective rotative positions of the distributor member, means defining a central opening in the distributor member registering with the drain passage at the plate member in all rotative positions of the distributor member, and a transfer passage communicating between said openings in the distributor member for passing to drain the fluid flowing through said transfer passage from the other passage of each respective pair of passages at the plate member in the respective rotative positions of the distributor member.

2. The valve of claim 1, wherein there is provided means for successively turning the distributor member from one rotative position to the next to shift said distributor passages from registration with one pair of passages at the plate member into registration with the next pair of passages at the plate member so that each passage of said pairs of passages at the plate member passes only one flow during the positioning of the distributor member at its successive rotative positions.

3. A valve comprising, in combination, a plate member provided with a drain passage and a plurality of spaced pairs of passages, the passages of each pair being positioned next to one another, walls separating each passage of each pair from fluid communication at the plate member with the other passage of the same pair and from fluid communication at the plate member with said drain passage, a distributor mounted in confronting relation with the plate member and mounted to be turned to a plurality of rotative settings, said distributor having a first passage extending therethrough positioned to register with a preselected passage of each pair of passages at the plate member in each of a plurality of rotative settings of the distributor, said distributor having an opening disposed next to said first distributor passage to register with the other passage of each pair of passages at the plate member in the respective rotative settings of the distributor, said distributor also having an opening positioned to register with said drain passage at the plate member in each rotative setting of the distributor, and said distributor having a transfer passage communicating between said openings for passing to drain the fluid flowing from the other passage of each respective pair of passages at the plate member in the respective rotative settings of the distributor.

4. In a fluid distribution device for water treatment apparatus, the combination of a plate member having a plurality of separate passages therethrough, fluid conduits at one side of said plate member for passing separate flows to and from said passages thereat, the passages at the plate member including a central drain passage and a plurality of pairs of passages, each passage of each pair of passages at the plate member being separated from fluid communication with the other passage of the same pair at the plate member and at said fluid conduits, means defining a fluid chamber at the opposite side of said plate member, a distributor mounted in said chamber for movement to preselected different rotative positions in confronting relation with said plate member to establish different flows through the plate member, said distributor having a first passage extending therethrough located to register with a preselected passage of each of said pairs of passages at the plate member in the different rotative positions of the distributor for passing fluid from said fluid chamber through said preselected passages of each pair at the plate member in succession as the distributor is turned successively to its different rotative positions, said distributor having a transfer passage positioned at one end in confronting relation with said central drain passage at the plate member in each rotative position of the distributor and at its other end located to register selectively with the other passage of each of said pairs of passages at the plate member in the different rotative positions of the distributor to pass to drain the fluid from said other passage of each pair at the plate member in succession as the distributor is turned successively to its different rotative positions.

5. A control valve comprising a stationary plate member having a central passage therethrough and a plurality of annularly spaced passages disposed around the central passage, a first conduit means communicating with at least three of the annularly spaced passages at said plate member, a second conduit means communicating with at least another three of the annularly spaced passages at said plate member, a fluid supply chamber connected to a source of fluid supply disposed across one face of the plate member for communication with said annularly spaced passages, a movable distributor member within the fluid supply chamber disposed across the plate member and having a passage therethrough positioned to register with one of said annularly spaced passages in each position of the distributor member and to block communication between the supply chamber and the other annularly spaced passages and between the supply chamber and the central passage, a transfer passage in the movable distributor member for establishing communication between the central passage and one of the annularly spaced passages in all but one position of the distributor member, and means for rotating the distributor member between various operative rotative positions.

6. A control valve comprising a lift turn valve including a plate member having a plurality of passages therein, a first conduit communicating with some of said passages and a second conduit communicating with others of said passages, said plate member having a passage separated from communication with said conduits, a housing attached to said plate member and providing a fluid supply chamber at one side thereof, and a distributor in said chamber mounted to be seated in confronting relation with said plate member and to be lifted away from said plate member, turned to one of a plurality of preselected rotative positions with respect to said plate member, and reseated in confronting relation with said plate member for establishing different flows through the valve, a fluid pressure responsive valve communicating with one of said conduits and controlling flow therefrom to a service line, and a conduit extending between said pressure responsive valve and said last-mentioned passage at the plate member, said distributor of the lift turn valve having a plurality of passages positioned respectively to register with said last-mentioned passage at the plate member at all but one of said preselected rotative positions of the distributor for passing fluid from said chamber in the lift turn valve to said pressure responsive valve to close the pressure responsive valve, and said distributor when unseated uncovering said last-mentioned passage at the plate member for passing fluid from said chamber in the lift turn valve to said pressure responsive valve to close the pressure responsive valve.

7. A multiport valve comprising, in combination, a plate member having a plurality of passages, one of said passages being a low pressure passage, a distributor cooperable with the plate member and having a plurality of passages adapted for different registration with the passages at the plate member in different rotative positions of the distributor, a housing member attached to the plate member and forming a fluid chamber in which the distributor is located, one of said members having a supply port normally communicating with said fluid chamber in the housing member to supply fluid under pressure to the valve, a stem having a longitudinal lost-motion connection to the distributor and rotatable to turn the distributor between different operative positions, and an auxiliary valve for controlling flow through the low pressure passage at the plate member, said auxiliary valve comprising means defining a tubular passage communicating with said low pressure passage, a ring snugly yet slidably received in said tubular passage and having a central opening for the flow of fluid therethrough, means for supporting the ring in said tubular passage, and a valve disk attached to the stem and positioned upon movement of the stem in one direction to engage the ring and cover the central opening therethrough to close said tubular passage before the stem turns the distributor and upon return movement of the stem in the opposite direction to uncover the central opening through the ring to reopen said tubular passage after the distributor has been turned to its next rotative position.

8. A lift turn valve comprising, in combination, a plate member provided with a plurality of passages, one of said passages being a low pressure passage, means defining a fluid supply chamber at one side of said plate member, a distributor in said chamber mounted to be positioned in confronting relation with said plate member and adapted to be unseated away from said plate member, turned, and reseated in confronting relation with said plate member for establishing different flows through the valve in different rotative positions of the distributor, a stem having a longitudinal lost-motion connection to the distributor for unseating the distributor upon movement of the stem longitudinally in one direction and rotatable to turn the distributor after unseating the same, said stem being movable longitudinally in the opposite direction for reseating the distributor, and an auxiliary valve controlling flow through the low pressure passage at the plate member, said auxiliary valve comprising means defining a tubular passage communicating with the low pressure passage, a ring snugly yet slidably received in said tubular passage and having a central opening for the flow of fluid therethrough, means for supporting the ring in said tubular passage, and a valve disk attached to the stem and positioned to engage the ring to cover the central opening therethrough to close said tubular passage upon initial lost-motion movement of the stem longitudinally in said one direction before unseating of the distributor and thereafter to slide the ring in said tubular passage to maintain said tubular passage closed upon continued movement of the stem in said one direction and to return the ring to its support upon return movement of the stem in said opposite direction and thereafter to uncover the central opening through the ring to reopen said tubular passage upon continued movement of the stem in said opposite direction after the distributor is reseated.

9. A lift turn valve comprising, in combination, a plate member provided with a plurality of passages, one of said passages being a low pressure passage located centrally at said plate member, means extending downwardly from said low pressure passage and defining a drain passage communicating therewith, a ring having a central opening therethrough snugly yet slidably received in said drain passage, means projecting into said drain passage limiting downward movement of the ring therein, a distributor mounted above said plate member to be positioned in confronting relation therewith and mounted to be lifted away from said plate member, turned, and moved downward to reseat in confronting relation with said plate member for establishing different flows through the valve at different rotative positions of the distributor, a housing mounted above said plate member and forming a fluid supply chamber for the distributor, a stem for moving the distributor having a longitudinal lost-motion connection to the distributor for unseating and subsequently reseating the distributor and rotatable to turn the distributor after unseating it, said stem extending downward below the distributor into said drain passage, and a valve disk connected to the lower end of said stem beneath said ring and positioned to engage the underside of the ring to cover the central opening therethrough to close said drain passage upon initial upward movement of the stem upwardly away from said ring movement limiting means in the drain passage before the distributor is unseated and upon continued upward movement of the stem to slide the ring upward in said drain passage to maintain said passage closed and upon downward movement of the stem to move downwardly to permit the ring to return to said ring movement limiting means in the drain passage and following the reseating of the distributor to move downwardly below the ring to uncover the central opening therethrough to reopen the drain passage.

10. A control valve comprising a plate member provided with a central drain passage and a plurality of spaced pairs of passages, the passages of each pair being located next to one another, walls at one side of the plate member separating each passage of each pair from fluid communication at the plate member with the other passage of the same pair, a distributor mounted in confronting relation with said plate member for establishing different flows through the valve in different rotative settings of the distributor, a fluid supply chamber on the other side of the plate member, said distributor having a first passage extending through the distributor for passing fluid from the supply chamber therethrough and positioned to register with a preselected passage of each pair of passages at said plate member in each of a plurality of rotative settings of the distributor, said distributor having an opening disposed next to said first-mentioned passage in the distributor to register with the other passage of each pair of passages at said plate member in the respective rotative settings of the distributor, said distributor having another opening registering with the drain passage in said plate member in all rotative settings of the distributor, a transfer passage in said distributor communicating between said openings in the distributor for passing to drain the fluid flowing therethrough from the other passage of each respective pair of passages at the plate member in the respective rotative settings of the distributor, a first conduit communicating at said plate member with a plurality of said preselected passages of each pair of passages in said plate member, and a second conduit communicating at said plate member with a plurality of said other passages of each pair of passages in said plate member.

11. A control valve comprising a plate member provided with a central drain passage and a plurality of spaced pairs of passages, the passages of each pair being located next to one another, walls at one side of the plate member separating each passage of each pair from fluid communication at the plate member with the other passage of the same pair, a distributor mounted in confronting relation with said plate member for establishing different flows through the valve in different rotative settings of the distributor, a fluid supply chamber on the other side of the plate member, said distributor having a first passage extending through the distributor for passing fluid from the supply chamber therethrough and positioned to register with a preselected passage of each pair of passages at said plate member in each of a plurality of rotative settings of the distributor, said distributor having an opening disposed next to said first-mentioned passage in the distributor to register with the other passage of each pair of passages at said plate member in the respective rotative settings of the distributor, said distributor having another opening registering with the drain passage in said plate member in all rotative settings of the distributor, a transfer passage in said distributor communicating between said openings in the distributor for passing to drain the fluid flowing therethrough from the other passage of each respective pair of passages at the plate member in the respective rotative settings of the distributor, a first conduit communicating at said plate member with a plurality of said preselected passages of each pair of passages in said plate member, a second conduit communicating at said plate member with a plurality of said other passages of each pair of passages in said plate member, a pressure responsive valve communicating with one of said conduits for controlling flow therefrom, a conduit extending from said other passage of one of said pairs of passages at the plate member of the control valve, said distributor of the control valve having a plurality of auxiliary openings extending therethrough and positioned to register with said last-mentioned other passage for passing fluid to said pressure responsive valve to close the pressure responsive valve in all but one rotative position of the distributor, said distributor in its other rotative setting positioning said transfer passage in registration with said last-mentioned other passage in the plate member for passing to drain said fluid at the pressure responsive valve and permit the pressure responsive valve to open.

12. A control valve comprising a plate member having a plurality of annularly spaced passages therein, a casing including a bottom wall and an upstanding side wall extending around said bottom wall and attached to said plate member to define a chamber on one side of said plate member, partition means extending across said chamber and separating the latter into separate compartments, one of said compartments communicating at said plate member with a first group of said passages and the other of said compartments communicating at said plate member with a second group of said passages, a pipe extending through said bottom wall and through said one of said compartments and communicating at said plate member with one of said passages in said first group of passages to separate the latter from communication with said one compartment, a distributor adapted to be seated in confronting relation with the other side of said plate member and turned between different rotative settings to establish different flows through said passages, and first and second conduits attached to said casing and communicating with said first and second compartments respectively.

13. A control valve comprising a plate member having a plurality of annularly spaced passages and a central passage therein, a casing including a bottom wall and an upstanding side wall extending around said bottom wall and secured to said plate member to define a chamber at one side of said plate member, a first pipe extending through said bottom wall and communicating at said plate member with said central passage to separate the latter from communication with said chamber, partition means extending between said first pipe and said casing and dividing said chamber into a plurality of separate compartments, a second pipe extending through said bottom wall and through one of said compartments and communicating at said plate member with one of said annularly spaced passages to separate the latter from communication with said one of said compartments, a plurality of conduits attached to said wall means and each communicating with one of said compartments, and a distributor adapted to be seated in confronting relation with the other side of said plate member and turned between different rotative settings to establish different flows through said passages.

14. A control valve comprising a plate member having a plurality of separate passages therein, a first conduit communicating at said plate member with a first group of said passages, the second conduit communicating at said plate member with a second group of said passages different from said first group, a housing attached to said plate member and providing a supply chamber at one side thereof, a discharge conduit communicating at said plate member with another of said passages different from said first and second groups of passages, and a distributor in said supply chamber mounted to be seated in confronting relation with said plate member and to be turned to different rotative settings in confronting relation with said plate member, said distributor having a first port therein communicating with the supply chamber in each rotative setting of the distributor arranged to establish flow from said supply chamber through one of said passages in one of said groups of passages in the plate member and having a second port therein communicating with the discharge conduit in each rotative setting of the distributor arranged to establish flow from one of the passages in the other group of passages and through said discharge conduit, in the different angular settings of the distributor, said distributor providing fluid communication respectively through each respective passage at the plate member only at a particular respective angular setting of the distributor and blocking each respective passage at the plate member at other angular settings of the distributor except said respective angular settings, so that water flows through each passage at the plate member only once during a complete sequence of angular settings of the distributor for a complete cycle of operation of the control valve.

15. A control valve comprising a plate member having a plurality of separate passages therein, a first conduit communicating at said plate member with a first group of said passages, the second conduit communicating at said plate member with a second group of said passages different from said first group, a housing attached to said plate member and providing a supply chamber at one side thereof, a discharge conduit communicating at said plate member with another of the passages therein different from said first and second groups of passages, a distributor in said supply chamber mounted to be seated in confronting relation with said plate member and to be turned to different rotative settings in confronting relation with said plate member, said distributor having a first port therein communicating with the supply chamber in each rotative setting of the distributor arranged to establish flow from said supply chamber through one of said passages in one of said groups of passages in the plate member and having a second port therein communicating with the discharge conduit in each rotative setting of the distributor arranged to establish flow from one of the passages in the other group of passages and through said discharge conduit, in the different angular settings of the distributor, said distributor providing fluid communication respectively through each respective passage at the plate member only at a particular respective angular setting of the distributor and blocking each respective passage at the plate member at other angular settings of the distributor except said respective angular settings, so that water flows through each passage at the plate member only once during a complete sequence of angular settings of the distributor for a complete cycle of operation of the control valve, valve means controlling the flow through said discharge conduit, and means for closing said valve means while said distributor is being turned between the angular settings thereof.

References Cited in the file of this patent

UNITED STATES PATENTS

| | | |
|---|---|---|
| 623,873 | Borden | Apr. 25, 1899 |
| 2,047,131 | Riche | July 7, 1936 |
| 2,051,155 | Staegemann | Aug. 18, 1936 |
| 2,093,692 | Daniels | Sept. 21, 1937 |
| 2,235,287 | Daniels | Mar. 18, 1941 |
| 2,504,816 | DeVille | Apr. 18, 1950 |
| 2,679,376 | Steiner | May 25, 1954 |

U. S. DEPARTMENT OF COMMERCE
PATENT OFFICE

CERTIFICATE OF CORRECTION

Patent No. 2,825,363                                    March 4, 1958

Paul G. Bird

It is hereby certified that error appears in the printed specification of the above numbered patent requiring correction and that the said Letters Patent should read as corrected below.

Column 10, line 24, for "A control valve comprising" read -- In a fluid treatment system, --.

Signed and sealed this 20th day of May 1958.

(SEAL)
Attest:

KARL H. AXLINE
Attesting Officer

ROBERT C. WATSON
Commissioner of Patents